United States Patent [19]

Kronenberg

[11] 4,247,775

[45] Jan. 27, 1981

[54] PIEZOELECTRIC DOSIMETER CHARGER

[75] Inventor: Stanley Kronenberg, Skillman, N.J.

[73] Assignee: The United States of America as represented by the Secretary of the Army, Washington, D.C.

[21] Appl. No.: 100,666

[22] Filed: Dec. 5, 1979

[51] Int. Cl.³ .............................................. G01T 1/18
[52] U.S. Cl. ............................................................ 250/377
[58] Field of Search ................ 250/376, 377, 378, 472

[56] References Cited

U.S. PATENT DOCUMENTS

| 2,630,535 | 3/1953 | Landsverk . | |
|---|---|---|---|
| 2,751,544 | 6/1956 | Stirnkorb . | |
| 2,753,463 | 7/1956 | Stout et al. . | |
| 2,759,138 | 10/1956 | Andrews | 250/377 |
| 2,770,765 | 11/1956 | Negus | 250/377 |
| 2,898,472 | 8/1959 | Hollmann | 250/377 |
| 3,017,511 | 1/1962 | Landsverk et al. . | |
| 3,144,557 | 8/1964 | Minton . | |
| 3,193,749 | 7/1965 | Grimm et al. | 250/377 |
| 3,341,761 | 12/1967 | Bryer | 250/377 |

*Primary Examiner*—Davis L. Willis
*Assistant Examiner*—Janice A. Howell

*Attorney, Agent, or Firm*—Nathan Edelberg; Sheldon Kanars; Jeremiah G. Murray

[57] ABSTRACT

Disclosed is a small portable extremely rugged charger for existing pocket-sized type radiation dosimeters. The charger is comprised of a rectangularly shaped housing which contains a piezoelectric charging circuit which is manually operated by a handle to produce a relatively high charging voltage. The charging voltage is coupled to a charging post mounted on a removable cover which is adapted to be selectively rotated so that the underside of the charging post is exposed to light from one of two light windows in the housing whereupon the dosimeter scale may be viewed by either direct or reflected light from any source available. The piezoelectric charging circuit is comprised of a pair of axially aligned cylinders of piezoelectric material mounted in a fulcrum type frame having a beam lever element in contact with one of the cylinders. A spring bias element is connected to the beam lever element and is actuated by a cam attached to the handle which when rotated acts upon the spring to cause an axial compressional force to be applied to the cylinders which thereby produce the required charging voltage.

17 Claims, 7 Drawing Figures

PIEZOELECTRIC DOSIMETER CHARGER

The invention described herein may be manufactured and used by or for the Government for governmental purposes without the payment of any royalties thereon or therefor.

BACKGROUND OF THE INVENTION

This invention relates to an energy source and more particularly to a separate charging device for generating electrical energy which is to be applied to a dosimeter for subsequent use in measuring local radiation.

Electrometer type dosimeters are well known. Such apparatus, however, requires charging to predetermined value prior to being used. Thereafter when the dosimeter is exposed to surrounding radiation, the electrometer begins to discharge because of the effects of the radiation. The extent to which the electrometer is discharged provides a measure of the amount of radiation sensed by the instrument. After the dosimeter has been sufficiently discharged either from radioactivity or after an extended period of non-use, it must be recharged before being used again.

While integrated battery operated and friction type chargers are known, piezoelectric means for charging a radiation meter is disclosed in U.S. Pat. No. 2,898,472, which issued to H. E. Hollmann on Aug. 4, 1959. There two configurations are disclosed. In each instance a piezoelectric crystal element receives an impact force imparted thereto from another member which causes an internal stress to be produced within the crystal causing the required charging potential to be produced.

It is an object of the present invention, therefore, to provide a separate piezoelectric type dosimeter charger which can be used to charge various types of existing dosimeters.

It is another object of the present invention to provide a charger of the type described which can be used with dosimeters made by different manufacturers for different ranges and which have different barrel sizes and different charging switches.

It is still another object of the present invention to provide a dosimeter charger apparatus which can be used in relatively low light levels; and Still a further object of the present invention is to provide an improved dosimeter charger which is relatively inexpensive and can be left on a shelf in an inactive state for long periods of time without detrimental effects.

SUMMARY

Briefly, the present invention is directed to an improved dosimeter charger and includes a piezoelectric charging circuit which is contained within a housing of a generally rectangular shape. The housing includes a cover on which is mounted a spring loaded charging post and an operating handle for activating the charging circuit. The cover is easily removable and is adapted to be rotated so that the underside of the charging post can be selectively positioned to receive light therethrough from an external source, either directly from a window in the back of the housing or indirectly by means of a reflector located within the housing adjacent a second window located in the sidewalls. The charging circuit itself consists of a pair of cylindrical piezoelectric elements located end to end in a frame having a fulcrum at one end with a beam lever element located thereon in contact with one of the piezoelectric elements. The piezoelectric elements are positioned in mutually opposing polarity relationship, so that when an axial pressure is exerted thereon, a common polarity voltage is coupled from mutually opposing faces of the elements via an electrical contact and circuit lead connected to the charging post. Axial pressure is applied to the beam lever element by means of the single loop wire spring and a cam connected to the operating handle on the outside of the cover. The cam also implements a grounding switch assembly for removing residual charges.

Other objects and advantages of the presnt invention will become apparent from a detailed description of the invention when considered in light of the various drawings.

DESCRIPTION OF THE PREFERRED EMBODIMENT

Figure 1:
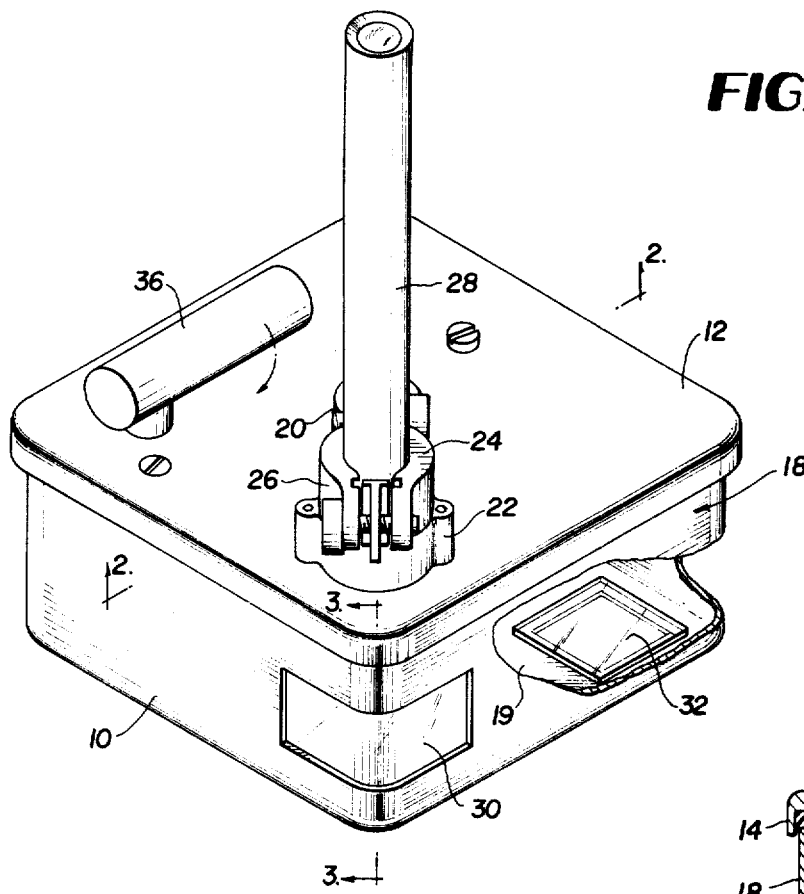
FIG. 1 is a perspective view including a cutaway section of the charger housing.
Figure 2:
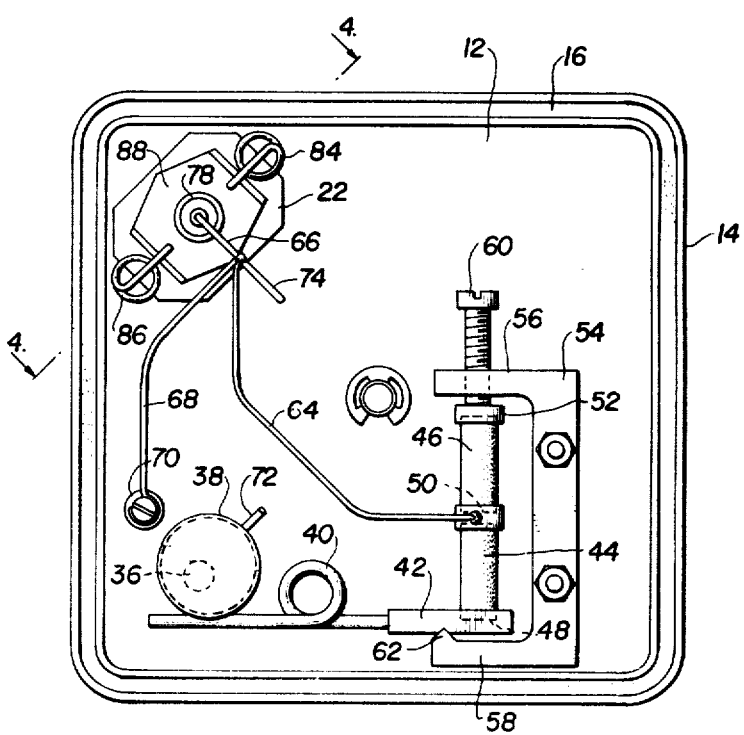
FIG. 2 is a transverse cross-sectional view of the housing shown in FIG. 1 taken along the lines 2—2 and being illustrative of the preferred embodiment of the charging unit contained therein.

Referring now to the drawings wherein like reference numerals refer to like elements throughout, attention is directed first to FIG. 1 wherein reference numeral 10 refers to a generally rectangular shaped housing such as included in a well known Bendix Model 880 or similar type DCPA apparatus. The housing includes a flat removable top cover 12, the underside of which is shown in FIG. 2. As shown in FIG. 2, the cover 12 includes a bifurcated edge 14 which includes a gasket member 16 which is adapted to engage the upper edge of the housing sidewalls 18. The cover 12 is held in place by means of a knurled bolt 20, which extends into the interior of the housing and engages a threaded member, not shown, attached to the inner surface of the housing's bottom wall.

The cover 12 has a charging post assembly 22 exteriorally mounted in one corner. This assembly additionally includes a pair of screw tightened gripping elements 24 and 26 which is adapted to engage and hold a conventional pocket-sized dosimeter 28 shown in place on the charging post.

Figure 3:
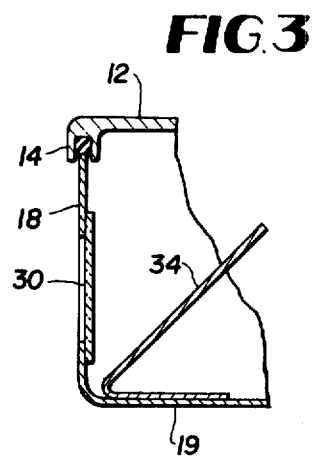
FIG. 3 is a vertical cross-sectional view of the housing shown in FIG. 1 taken along the lines 3—3 and being illustrative of the light reflector contained therein adjacent a window in the sidewalls of the housing.

The charging post 22 is placed in the corner of cover plate 12 so that light from an external source, not shown, can be directed through the dosimeter 28 during a charging operation in one of two ways, either by means of light entering a window 30 located in adjacent corners of sidewalls 18 or a window 32 located in the bottom wall 19. By loosening the bolt 20, the cover 12 can be rotated to receive light from one or the other of the windows 30 or 32. As shown in FIG. 3, the window 30 is located adjacent an angulated reflector member 34 which is secured to the bottom wall 19. Accordingly, light entering the window 30 is reflected from the surface of the reflector member 34 upward into the dosimeter 28 when the cover 12 is positioned as shown in FIG. 1. This position is particularly adapted for charging the dosimeter using a relatively strong source of light. However, when this light is insufficient, the cover 12 would be rotated so that the charging post 22 is in alignment with the window 32, whereupon the entire apparatus would be picked up and directed to whatever source of light is available. The first noted position is particularly adapted for use when the housing 10 is positioned on a flat surface, for example the top of a table or some such support.

In addition to the charging post assembly 22 located in one corner of the cover 12, there is also located a rotatable handle 36 located in the adjacent corner. The handle 36 connects to a circular cam 38 located on the underside of the cover 12 (FIG. 2) and has for its function the application of an outward force on one end of a single coil wire spring type member 40 which is bonded to one end of a beam lever element consisting of a metal plate 42. The plate element 42 contacts and holds one of a pair of piezoelectric members 44 and 46 which operate to generate a relatively high charging potential when subjected to a compressional force. The piezoelectric elements 44 and 46 are commercially available items and are comprised of a composition of lead, zirconium and titanate (P-Z-T) which is a ceramic like substance which is easily formed in a desired shape. In the subject invention, the piezoelectric material is in the form of two substantially identical cylindrical members which are axially aligned and held in position by means of a small bore 48 in the metal plate 42, an electrical coupling member 50 and an end cap 52. These parts are supported within a C shaped frame 54 having a pair of projecting end portions 56 and 58. The upper end portion 56 includes a threaded hole through which a retaining screw 60 passes for engagement with the end cap 52. The other end portion 58 includes a raised edge 62 which engages the lower surface of the plate element 42 so that a fulcrum is provided thereat whereby a force transferred to the spring 40 by means of the cam 38 is coupled to the piezoelectric elements 44 and 46 as a compressional force, the effect of which is to cause the piezoelectric elements to produce an electrical voltage across their respective end faces. By placing the two piezoelectric elements 44 and 46 so that like polarity (+) end faces exist at the coupling member 50, a relatively high charging voltage (15 kV) is produced.

The charging voltage developed by the piezoelectric elements 44 and 46 is coupled to the charging post assembly 22 by means of an electrical lead 64 which is soldered to the inner conductor 66 of the charging post assembly 22. The inner conductor 66 is also connected to an electrical lead 68 which is secured to an insulated post 70. The end of the wire 68 wound on the post 70 is adapted to make contact with a metal tip 72 on the periphery of the cam 38. These two elements act as a grounding switch in a manner to be described. Also, a second electrical lead 74 is soldered to the inner conductor 66 for acting as a switch contact for removing the residual charge on the exterior contact of the dosimeter deposited thereon during a charging procedure.

Figure 4:
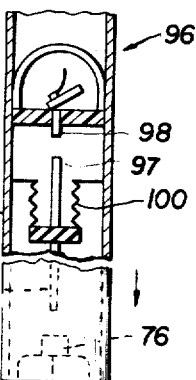
FIG. 4 is an axial cross-sectional view of the charging post mounted on the cover portion of the housing shown in FIG. 1.

Prior to discussing the operation of the subject invention, reference is made to FIG. 4 which is generally illustrative of the charging post assembly 22. As shown in FIG. 4, the inner conductor 66 is coupled to a charging post 76 through a cylindrical outer conductor 78 which is slidable within a screw threaded sleeve 80. The sleeve is fastened to the outer surface of the cover 12 by means of a nut 82. The outer conductor 78 is spring biased upwardly by means of a pair of spring members 84 and 86 which have one end engaging an angulated sheet metal piece 88 which projects into the bore 90 and abuts a shoulder 92 on the outer conductor 78. This type of device is conventional and operates such that when the dosimeter 28 is pressed down on the assembly 22 the charging pin 94 which contacts the electrometer assembly 96 through an internal dosimeter switch including the members 97 and 98 and a compressible bellows 100 comes in contact with the charging post 76; however, the action of the springs 84 and 86 prevent damage to the dosimeter as it comes in contact with the charging post assembly 22.

Figure 5:
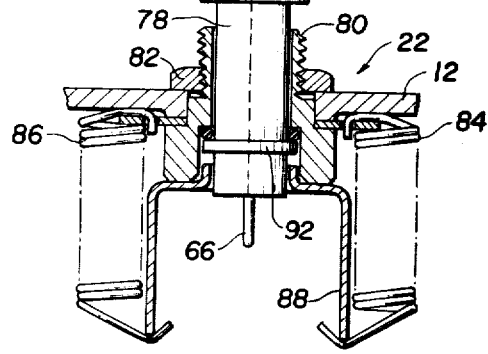
FIG. 5 is an electromechanical diagram illustrative of the charging unit in a preliminary mode of operation prior to charging a dosimeter.
Figure 5:
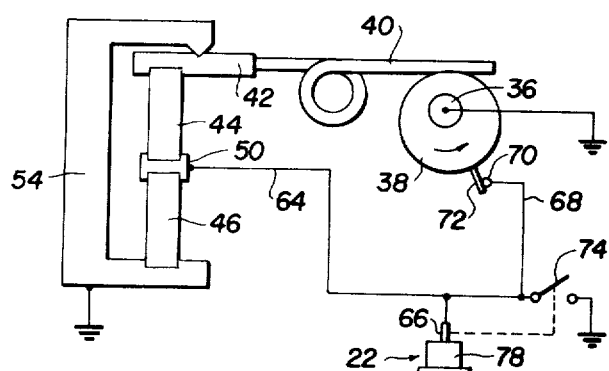

Considering now the operation of the charger embodying the subject invention, reference is now made to FIG. 5. There a diagram is disclosed which is illustrative of the dosimeter 28 being pressed down on the charging post assembly 22 whereupon the charging post 76 and the charging pin 94 make contact. Also the downward motion of the inner conductor 66 causes the wire lead 74 to be lifted from the inner surface of the cover 12 and thus removing a ground connection thereat. In addition, FIG. 5 is illustrative of the fact that prior to charging, the handle 36, shown in FIG. 1, is rotated in a direction to cause the cam 38 and the pin 78 to make contact with the wire 68. This causes the coupling member 50 to be grounded through the cam 38 and handle 36, which in turn grounds the positive (+) ends of the piezoelectric elements 44 and 46. Since their negative (−) ends are connected to ground through the support frame 54, a closed circulating path is provided and any charge remaining on the elements 44 and 46 is removed.

Figure 6:
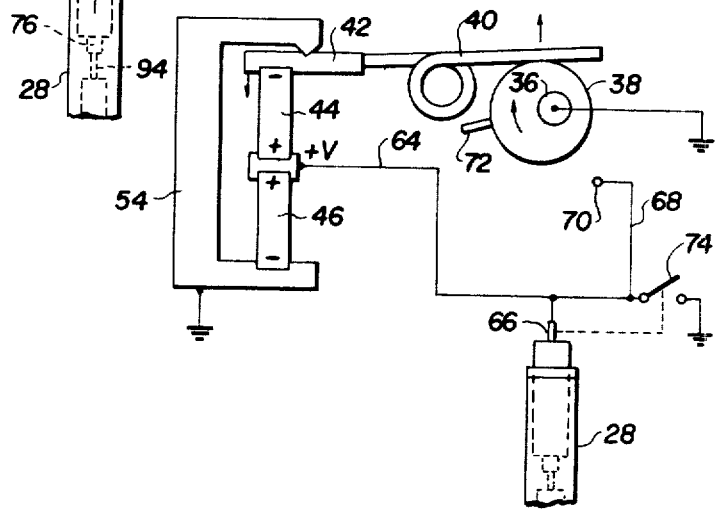
FIG. 6 is an electromechanical diagram illustrative of the charging unit during a charging mode of operation.

Next, looking at FIG. 6 the dosimeter 28 is charged by rotating the handle 36 and accordingly, the cam 38 in the opposite direction from that shown in FIG. 5. This action imparts an upward force on the outer end of the wire spring 40. Since the spring 40 is not pivoted, the outer end of the pivoted plate member 42 experiences a force proportional to the force exerted by the cam 38 on the spring. This force is magnified by the lever action defined by the position of the fulcrum point 62. The upward force applied is translated via the fulcrum point 62 into a compressional force which is applied to the outer end face of piezoelectric element 44. Since both piezoelectric elements 44 and 46 are axially aligned, both elements experience an internal stress which will produce a cumulative positive charging voltage +V which is coupled to the inner conductor 66 of the charging post assembly via the circuit lead 64.

Figure 7:
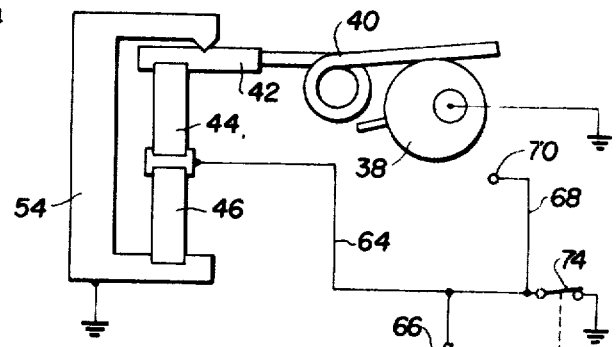
FIG. 7 is an electromechanical diagram illustrative of the charging unit in a removal mode of operation.

Following transfer of the charging potential to the dosimeter 28 as shown in FIG. 6, it is often necessary, following the charging of low range dosimeters, to remove the residual charge deposited by the charging process on the exterior contact 97 of the dosimeter switch, (FIG. 4) which acts to induce a charge on the electometer fiber. As this charge leaks off, the bound charge is freed and may produce spurious dosimeter readings. In order to prevent this occurrence, the external portion of the dosimeter switch is momentarily grounded immediately after charging by means of the wire element 74 which as noted above with reference to FIG. 2, is soldered on the inner conductor 66 and is adapted to contact the inner surface of the cover 12 when the charging post assembly 22 is urged back to its rest position by the bias springs 84 and 86 shown in FIG. 4. Accordingly as shown in FIG. 7, as the downward pressure of the dosimeter 28 is removed following charging, the wire element 74, being connected to the inner conductor 66, is adapted to momentarily ground the charging pin 94 via the charging post 76 which is directly connected to the inner conductor 66. The charge previously transferred to the dosimeter 28 is not affected, since in releasing the dosimeter after charging, the internal switch contact 98 of the dosimeter separates from the contact 97. The momentary grounding of the charging pin has heretofore been accomplished manually.

Thus what has been shown and described is a new and improved dosimeter charger which utilizes piezoelectric elements to provide the power source which results in a relatively simple and rugged device. Also, the housing enclosing the charging circuit includes the additional versatility of projecting light either indirectly or directly into the dosimeter to be charged depending upon the circumstances prevailing during the charging procedure.

While there has been shown and described what is at present considered to be the preferred embodiment of the subject invention, further modifications thereto will readily occur to those skilled in the art. It is not desired, therefore, that the invention be limited to the specific arrangements shown and described, but it is to be understood that all equivalents, alterations and modifications coming within the spirit and scope of the invention as defined by the following claims are herein meant to be included.

I claim as my invention:

1. Apparatus for charging an electrometer type dosimeter, comprising in combination:
    a housing;
    means on said housing for receiving a dosimeter and establishing electrical contact therewith;
    a movable element exterior to said housing for operating a charging circuit; and
    a charging circuit located in said housing, said circuit being coupled to said movable element and including at least one substantially immovable piezoelectric element adapted to generate an electrical charge in response to a mechanical force being applied thereto, means including lever means coupled to said movable element and being responsive to a charging motion imparted to said movable element to convert said charging motion of said movable element into a mechanical force applied to said piezoelectric member which thereby produces an electrical charge, and electrical circuit means coupling said electrical charge from said piezoelectric member to said means establishing electrical contact with said dosimeter.

2. The apparatus as defined by claim 1 and additionally including circuit means for removing charge from said piezoelectric element in response to a reverse motion of said movable element.

3. The apparatus as defined by claim 1 wherein said movable element comprises a rotatable handle, and wherein said means coupled to said rotatable handle converts a rotational charging motion into a compressional force applied to said piezoelectric member.

4. The apparatus as defined by claim 3 wherein said converting means includes means for holding opposite ends of said piezoelectric element, said holding means including a frame having a pair of projecting end portions, one of said end portions having means for rigidly securing one end of said piezoelectric element, the other of said end portions including said lever means, said lever means having means for receiving the other end of said piezoelectric element, and mechanical coupling means including a rotatable eccentric cam coupled between said lever means and said handle, said eccentric cam being operable to convert the rotational charging motion of said handle to a linear force which is applied as a compressional force to said piezoelectric member.

5. The apparatus as defined by claim 4 wherein said other end portion of said frame includes a fulcrum and said lever means comprises a beam lever element located on said fulcrum, said piezoelectric element being on one side of said fulcrum and said eccentric cam being coupled to said beam lever element on the other side of said fulcrum.

6. The apparatus as defined by claim 5 and additionally including a deformable wire element coupling said cam to said beam lever element.

7. The apparatus as defined by claim 6 wherein said cam includes a camming surface and wherein said wire element comprises a single loop spring having one end in contact with said camming surface.

8. The apparatus as defined by claim 4 and additionally including a second piezoelectric member axially aligned with said at least one piezoelectric member in said frame, said piezoelectric members being in face-to-face electrical polarity relationship in said frame whereby a common polarity electrical charge is developed at adjoining ends of said piezoelectric means, and wherein said electrical circuit means coupling said electrical charge comprises an electrical circuit lead connected from said adjoining ends to said means establishing electrical contact with said dosimeter.

9. The apparatus as defined by claim 4 and additionally including circuit means for removing charge from said piezoelectric members in response to a reverse motion of said handle.

10. The apparatus as defined by claim 9 wherein said charge removing circuit means includes a pair of switch contacts coupled to ground when closed, one of said switch contacts being located on said cam and the other contact being located in a fixed position adjacent said cam, and additionally including a circuit lead connecting the adjoining means of said piezoelectric members to said fixed contact.

11. The apparatus as defined by claim 4 wherein said dosimeter includes an internal switch comprising interior and exterior switch contacts and additionally including circuit means for removing charge on said exterior switch contact in response to a motion removing said dosimeter from said receiving means.

12. The apparatus as defined by claim 1 wherein said means for receiving a dosimeter comprises a spring biased charging post assembly having a charging conductor which moves inwardly of said housing upon the application of a downward force applied to the charging post during the mounting of a dosimeter thereon, and additionally including an electrical contact element connected to said charging conductor, said contact element extending to but out of contact with the inner surface of said housing when a dosimeter is in place during a charging procedure, but being operable to touch said inner surface as the dosimeter is being removed and thus adapted to momentarily ground and remove the residual charge on the exterior contact of a dosimeter switch assembly within the dosimeter.

13. The apparatus as defined by claim 1 wherein said means for receiving said dosimeter comprises a charging post having a light conduit therethrough for coupling light to a dosimeter mounted on said charging post and wherein said housing includes a pair of windows for providing direct light and reflected light, respectively, to said light conduit for illuminating a dosimeter scale located within the dosimeter.

14. The apparatus as defined by claim 13 wherein said housing includes a removable and selectively orientable cover, said charging post being located on said cover, wherein said window for providing direct light is located in a wall of said housing opposite from said cover, wherein said window for providing reflected light is located in the sidewall region of said housing, and additionally including a light reflector within said housing adjacent said window for providing reflected light for reflecting incident light to said light conduit in said charging post.

15. The apparatus as defined by claim 14 wherein said window for providing reflected light comprises a window formed in adjoining sidewalls of said housing.

16. The apparatus as defined by claim 13 and additionally including dosimeter clamp means located on said charging post for holding said dosimeter in place during a charging procedure.

17. The apparatus as defined by claim 16 wherein said clamp means is selectively adjustable to accommodate dosimeters of various sizes and makes.

* * * * *